(12) United States Patent
Wang et al.

(10) Patent No.: US 11,593,961 B2
(45) Date of Patent: Feb. 28, 2023

(54) DIFFERENCE-GUIDED VIDEO ANALYSIS

(71) Applicant: International Business Machines Corporation, Armonk, NY (US)

(72) Inventors: Lingyun Wang, Beijing (CN); Qing Wang, Beijing (CN); Shi Lei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/120,331

(22) Filed: Dec. 14, 2020

(65) Prior Publication Data

US 2022/0189057 A1    Jun. 16, 2022

(51) Int. Cl.
*G06T 7/00* (2017.01)
*G06T 7/73* (2017.01)
(Continued)

(52) U.S. Cl.
CPC ............... *G06T 7/74* (2017.01); *G06N 3/04* (2013.01); *G06T 3/40* (2013.01);
(Continued)

(58) Field of Classification Search
CPC . G06T 2207/10016; G06T 2207/20084; G06T 7/20; G06T 7/11; G06T 7/194; G06T 7/254; G06T 7/70; G06T 7/73; G06T 2207/20132; G06T 2207/20224; G06T 9/002; G06V 10/82; G06V 10/25; G06V 20/58; G06V 10/255; G06V 10/40; G06V 10/62; G06V 2201/07; G06N 3/04; G06N 3/0454

See application file for complete search history.

(56) References Cited

U.S. PATENT DOCUMENTS

2014/0198257 A1   7/2014  Gagvani et al.
2016/0171852 A1*  6/2016  Lin .................. G06T 7/215
                                       382/103
(Continued)

OTHER PUBLICATIONS

V. Ružička and F. Franchetti, "Fast and accurate object detection in high resolution 4K and 8K video using GPUs," 2018 IEEE High Performance extreme Computing Conference (HPEC), 2018, pp. 1-7, doi: 10.1109/HPEC.2018.8547574. (Year: 2018).*

(Continued)

*Primary Examiner* — Li Liu
(74) *Attorney, Agent, or Firm* — Eric Chesley (57) ABSTRACT

A method can include obtaining, from a video having a first resolution, a set of frames having a second resolution. The first resolution can be higher than the second resolution. The set of frames can include a first frame and a second frame. The method can include generating a difference feature map. The method can include obtaining a third frame having the first resolution. The method can include detecting, based on the difference feature map, a first location of a first object in the third frame. The method can include cropping, from the third frame, a first cropped area. The first cropped area can be smaller than a third frame area. The method can include generating, based on a feature map and the difference feature map, a spatial attention layer. The method can include detecting, by the spatial attention layer, the first object in the first cropped area.

20 Claims, 7 Drawing Sheets

(51) Int. Cl.
*G06N 3/04* (2023.01)
*G06T 3/40* (2006.01)

(52) U.S. Cl.
CPC .............. *G06T 2207/10016* (2013.01); *G06T 2207/10024* (2013.01); *G06T 2207/20084* (2013.01); *G06T 2207/20132* (2013.01)

(56) References Cited

U.S. PATENT DOCUMENTS

| | | | | |
|---|---|---|---|---|
| 2019/0057588 | A1* | 2/2019 | Sawides | G08B 13/19604 |
| 2020/0402215 | A1* | 12/2020 | Yang | A61B 6/032 |
| 2021/0078594 | A1* | 3/2021 | Bansal | G01C 21/3407 |
| 2021/0081673 | A1* | 3/2021 | Lai | G06V 40/20 |

OTHER PUBLICATIONS

Amin, M., "Video Surveillance-as-a-Service: Next Generation CCTV Surveillance Leveraging 5G and AI", Jul. 3, 2020, 9 pages.
Saini et al., "sZoom: A Framework for Automatic Zoom into High Resolution Surveillance Videos", Sep. 23, 2019, 17 pages.
Sleit et al., "A Query Answering Surveillance System for Detecting and Tracking Moving Objects using Boundary Rectangles", Feb. 2009, 7 pages.
Unel et al., "The Power of Tiling for Small Object Detection", Jun. 17, 2019, 10 pages.
Chai, Y., "Patchwork: A Patch-wise Attention Network for Efficient Object Detection and Segmentation in Video Streams", 2019 IEEE/CVF International Conference on Computer Vision (ICCV), Feb. 27, 2020, 10 pages.
Haris et al., "Task-Driven Super Resolution: Object Detection in Low-resolution Images", Mar. 30, 2018, 26 pages.
Mell et al., "The NIST Definition of Cloud Computing", Recommendations of the National Institute of Standards and Technology, Sep. 2011, 7 pages.
"Patent Cooperation Treaty PCT Notification of Transmittal of the International Search Report and the Written Opinion of the International Searching Authority, or the Declaration", Applicant's file reference DP/P49961GB, International application No. 2117081.6, International filing date Nov. 26, 2021, dated Jul. 11, 2022, 10 Pgs.
Li et al., "Zoom Out and In Network with Map Attention Decision for Region Proposal and Object Detection", Jun. 20, 2018, 14 Pgs, ,https://doi.org/10.1007/s11263-018-1101-7>.
Ruzicka et al., "Fast and Accurate Object Detection in High Resolution 4K and 8K video using GPUs", Department of Electrical and Computer Engineering, Carnegie Mellon University, Download Jul. 6, 2022, 7 Pgs.

* cited by examiner

DIFFERENCE-GUIDED VIDEO ANALYSIS

BACKGROUND

The present disclosure relates to video analysis, and more specifically, to high-definition video analysis.

Video analysis can include detecting objects and their locations within frames of a video, such as a digital video recording. Video analysis can further include operations such as object classification and motion recognition of detected objects. In some instances, at least one convolutional neural network (CNN) can be employed to analyze a video to perform a video analysis operation. The effectiveness of video analysis can be increased with increased resolution of a video that is analyzed.

SUMMARY

According to embodiments of the present disclosure, a method can include obtaining, from a video having a first resolution, a set of frames having a second resolution. The first resolution can be higher than the second resolution. The set of frames can include a first frame and a second frame adjacent to the first frame. The method can include generating, based on the first frame and the second frame, a difference feature map. The method can include obtaining, from the video, a third frame having the first resolution. The third frame can have a third frame area. The method can include detecting, based on the difference feature map, a first location of a first object in the third frame. The method can include cropping, from the third frame, a first cropped area corresponding to the first object. The first cropped area can be smaller than the third frame area. The method can include generating a first feature map of the first cropped area. The method can include generating, based on the first feature map and the difference feature map, a spatial attention layer. The method can include detecting, by the spatial attention layer, the first object in the first cropped area.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to video analysis; more particular aspects relate to difference-guided video analysis. While the present disclosure is not necessarily limited to such applications, various aspects of the disclosure may be appreciated through a discussion of various examples using this context.

Video analysis can include detecting objects and their locations within frames of a video, such as a digital video recording. Video analysis can further include operations such as object classification and motion recognition of detected objects. In some instances, at least one convolutional neural network (CNN) can be employed to analyze a video to perform a video analysis operation. The effectiveness of video analysis can be increased with increased resolution of a video that is analyzed. For example, in some instances, video objects having a size of 32 or fewer pixels can be detected with higher accuracy in a video having a resolution of (7,680×4,320) pixels (hereinafter, "8K resolution") than in a video having a resolution of (720×576) pixels.

However, the increased resolution of such a video can also present challenges. For example, processing a video having a high resolution (e.g., a resolution of approximately (1,280×720) pixels to approximately 8K resolution or higher) can increase processing times and/or a cost of tools, such as memory and/or processors, employed to process the video. In some instances, processing such high-resolution videos can consume a bandwidth sufficient to burden systems and/or networks.

To address these and other challenges, embodiments of the present disclosure include a difference-guided video analysis system ("DGS"). According to embodiments of the present disclosure, the DGS can improve an efficiency of object detection in higher-resolution frames of a video through the use of a difference feature map generated from lower-resolution frames of the video. More specifically, in some embodiments, the DGS can obtain video data, such as a digital video having an 8K resolution. From the digital video, the DGS can extract adjacent frames and convert the adjacent frames to a lower resolution (e.g., (720×480) pixels). The DGS can generate a difference feature map from a difference between the lower-resolution adjacent frames. Based on the difference feature map, the DGS can determine a location of an object in higher-resolution frames of the video. Based on the location, the DGS can crop an area that corresponds to the object from the higher-resolution frames. The DGS can further detect the object within the cropped area of higher-resolution, employing spatial attention that is based, in part, on the difference feature map. Thus, in effect, embodiments of the present disclosure can use a difference between lower-resolution video frames to "guide" the detection of objects in higher-resolution video frames.

Accordingly, by using lower-resolution frames to detect objects in a higher-resolution video, embodiments of the present disclosure can reduce time and/or resources that would be employed to process the higher-resolution video for object detection. Embodiments of the present disclosure can improve the field of video analysis by improving processing efficiency while maintaining or improving an accuracy of object detection in high-resolution (e.g., 8K resolution) videos. In some embodiments, the DGS can improve an accuracy of one or more video analysis operations by employing a spatial attention layer.

Figure 1:
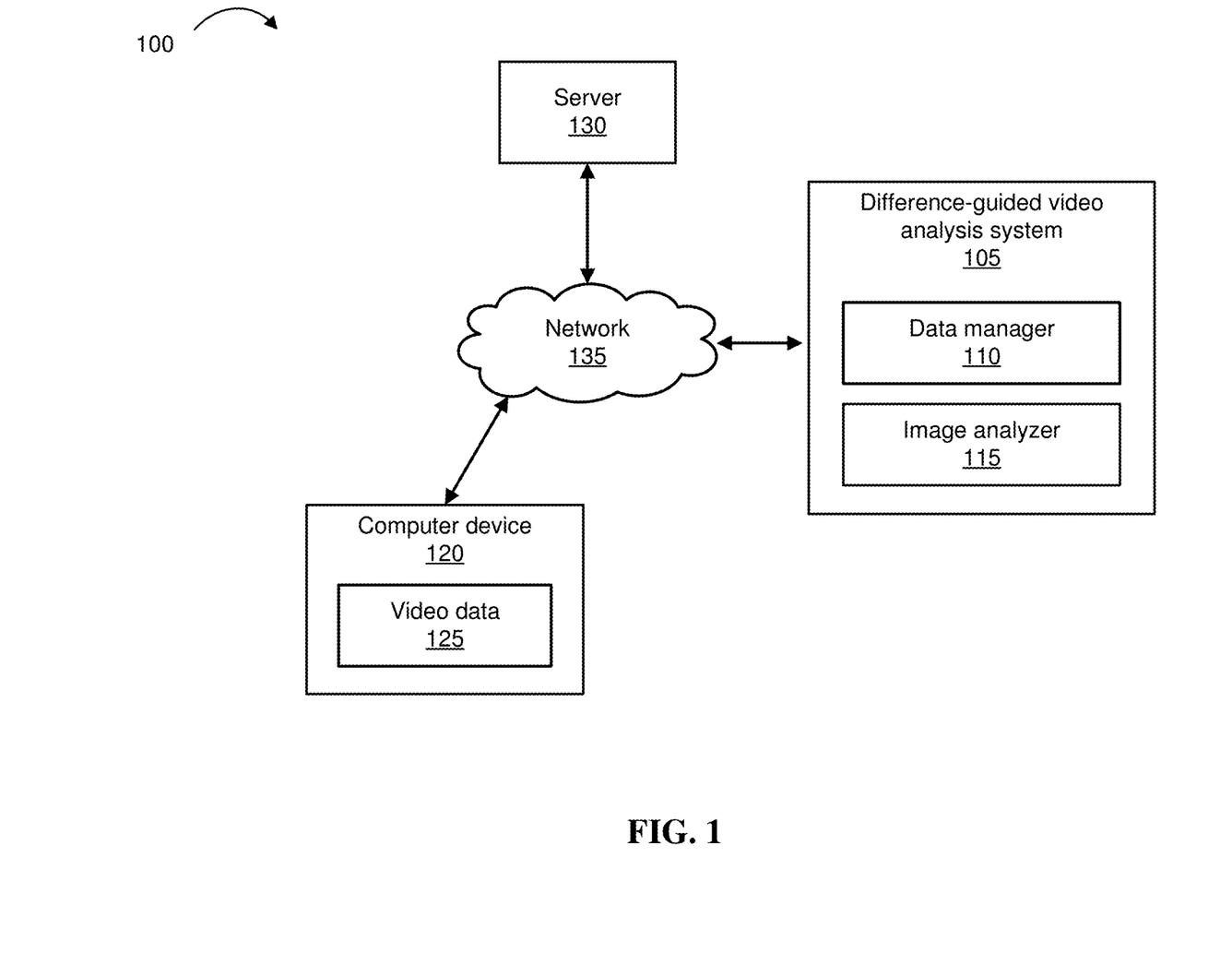
FIG. 1 depicts an example computing environment having a difference-guided video analysis system, in accordance with embodiments of the present disclosure.

Turning to the figures, FIG. 1 illustrates a computing environment 100 that includes one or more of each of a DGS 105, a computer device 120, a server 130, and/or a network 135. In some embodiments, at least one DGS 105, computer device 120, and/or server 130 can exchange data with at least one other through the at least one network 135. One or more of each of the DGS 105, computer device 120, server 130, and/or network 135 can include a computer system, such as the computer system 501 discussed with respect to FIG. 5.

In some embodiments, the DGS 105 can be included in software installed on a computer system of at least one of the computer device 120 and/or server 130. For example, in some embodiments, the DGS 105 can be included as a plug-in software component of software installed on a computer device 120. The DGS 105 can include program instructions implemented by a processor, such as a processor of a computer device 120, to perform one or more operations discussed with respect to FIGS. 2-4.

In some embodiments, the DGS 105 can include one or more modules, such as a data manager 110 and/or image analyzer 115. In some embodiments, the data manager 110 and the image analyzer 115 can be integrated into a single module. In some embodiments, the data manager 110 can obtain, interpret, analyze, store, and/or initiate storage of data, such as video data 125. In some embodiments, the image analyzer 115 can employ image processing, editing, and/or analysis technology to analyze data, such as video data 125. In some embodiments, image analyzer 115 can include a CNN. In some embodiments, the data manager 110 and/or image analyzer 115 can include program instructions implemented by a processor, such as a processor of a computer device 120, to perform one or more operations discussed with respect to FIGS. 2-4. For example, in some embodiments, the data manager 110 can include program instructions to perform operations 405 and 410, FIG. 4. In some embodiments, the image analyzer 115 can include program instructions to perform operations 415-435, FIG. 4.

In some embodiments, the one or more computer devices 120 can include one or more desktop computers, laptops, tablets, and the like. In some embodiments, the one or more computer devices 120 can include video data 125. In some embodiments, the video data 125 can include information such as videos (e.g., digital video files) and/or video frames/images. In some embodiments, video data 125 can include information corresponding to video analyses, such as RGB values, predetermined thresholds, and the like. In some embodiments, video data 125 can be included on one or more servers 130. In some embodiments, the one or more servers 130 can include one or more web servers.

In some embodiments, the network 135 can be a wide area network (WAN), a local area network (LAN), the internet, or an intranet. In some embodiments, the network 135 can be substantially similar to, or the same as, cloud computing environment 50 discussed with respect to FIG. 6.

Figure 2:
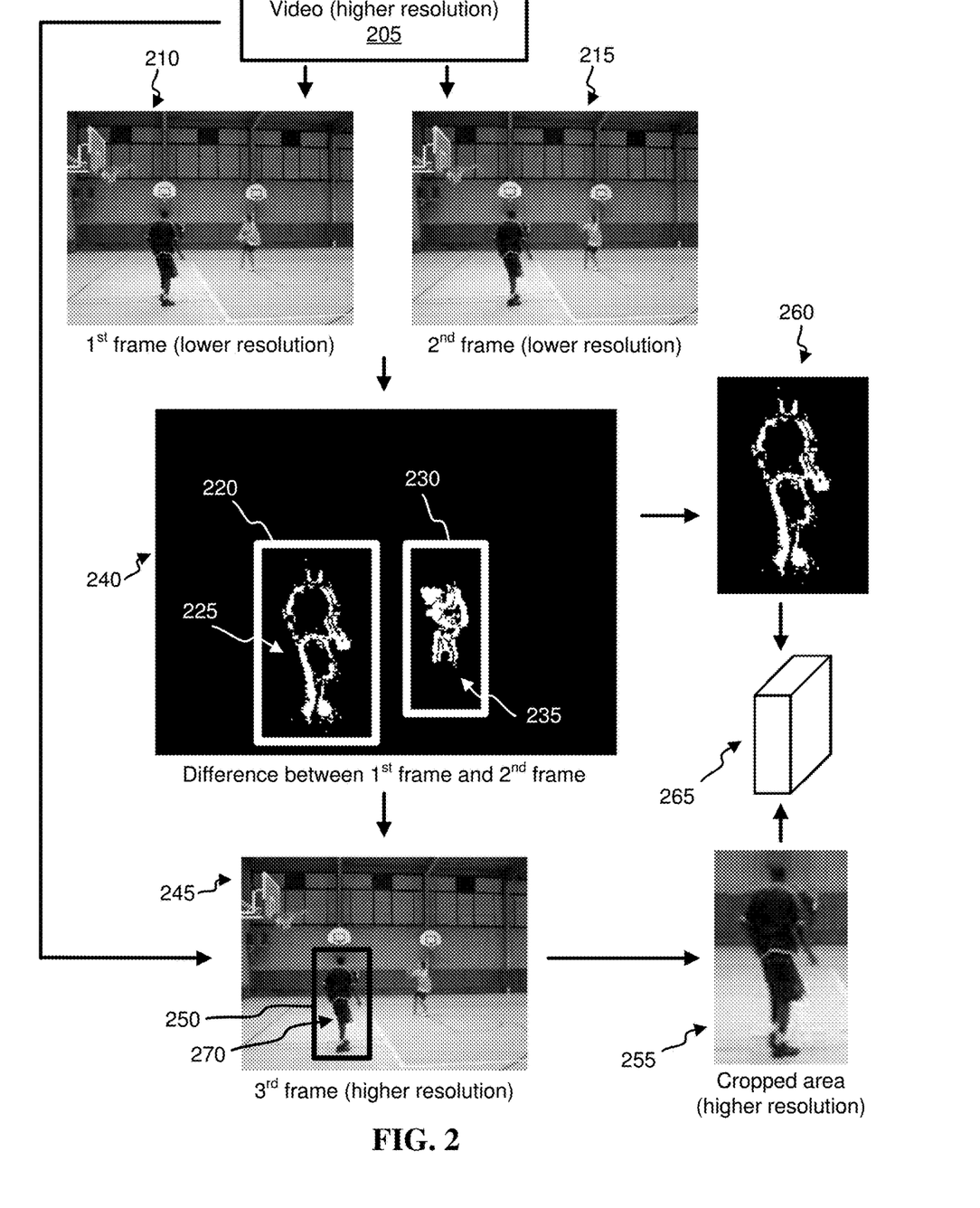
FIG. 2 depicts example video frames analyzed in accordance with embodiments of the present disclosure.

FIG. 2 illustrates an example video 205 from which a DGS (e.g., DGS 105, FIG. 1) can generate a spatial attention layer 265, according to embodiments of the present disclosure. The video 205 can have an 8K resolution. From the video 205, the DGS can extract a first frame 210 and a second frame 215. The first frame 210 and the second frame 215 can be adjacent frames of the video 205 and can each have a resolution of (720×480) pixels. The first frame 210 and a second frame 215 can be composed of a respective set of pixels that make up the images visible in the first frame 210 and the second frame 215. Each pixel can have a location (e.g., X and Y coordinates in the corresponding frame). Additionally, a color of each pixel can correspond to a set of Red Green Blue ("RGB") values. For example, the color white can correspond to RGB values (255, 255, 255), and the color black can correspond to RGB values (0, 0, 0).

The DGS can generate a difference feature map image 240, which can represent a difference between the first frame 210 and the second frame 215. For example, generating the difference feature map image 240 can include subtracting the second frame 215 from the first frame 210. The subtracting operation can correspond to subtracting the RGB values for each pixel location in the second frame 215 from the RGB values for each corresponding pixel location in the first frame 210. In the difference feature map image 240, the regions that appear black can indicate pixel locations where the subtracting operation results in RGB values that do not exceed a threshold, such as RGB values less than (100, 100, 100). Such RGB values can indicate that there is no significant difference between the first frame 210 and the second frame 215 in those regions. In contrast, in the difference feature map image 240, the regions that appear white can indicate pixel locations where the subtracting operation results in RGB values exceed a threshold, such as RGB values greater than (100, 100, 100). Such RGB values can indicate motion of an object between the first frame 210 and the second frame 215.

From the difference feature map image 240 and/or the RGB values corresponding to the difference feature map image 240, the DGS can detect an approximate location of a first object 225 and a second object 235 that exhibit movement between the first frame 210 and the second frame 215. The DGS can generate a first bounding box 220 that encloses a first bounding box area. The first bounding box area can include pixel locations corresponding to the first object 225. The DGS can additionally generate a second bounding box 230 that encloses a second bounding box area. The second bounding box area can include pixel locations corresponding to the second object 235.

From the video 205, the DGS can extract a third frame 245 having an 8K resolution. Based on the first bounding box 220, the DGS can generate a third bounding box 250 for the third frame 245. The third bounding box 250 can enclose a third bounding box area that includes pixel locations corresponding to a third object 270. The third object 270 can correspond to the first object 225.

Based on the third bounding box 250, the DGS can extract a cropped area 255 from the third frame 245. The cropped area 255 can include a magnified image of the third object. The DGS can generate a spatial attention layer 265 for a CNN based on the cropped area 255 and object data 260 corresponding to the first object 225 of the difference feature map image 240 (see, e.g., formula (1), below). The DGS can employ the spatial attention layer 265 to classify and/or accurately locate the third object 270 in subsequent 8K-resolution frames of the 8K-resolution video 205. Accordingly, the DGS can classify and/or accurately locate the third object 270 by processing the cropped area 255 as opposed to processing the entire frame 245. In this way, the DGS can reduce time and/or resources for detecting (e.g., classifying and localizing) an object in a high-resolution (e.g., 8K) video.

Figure 3:
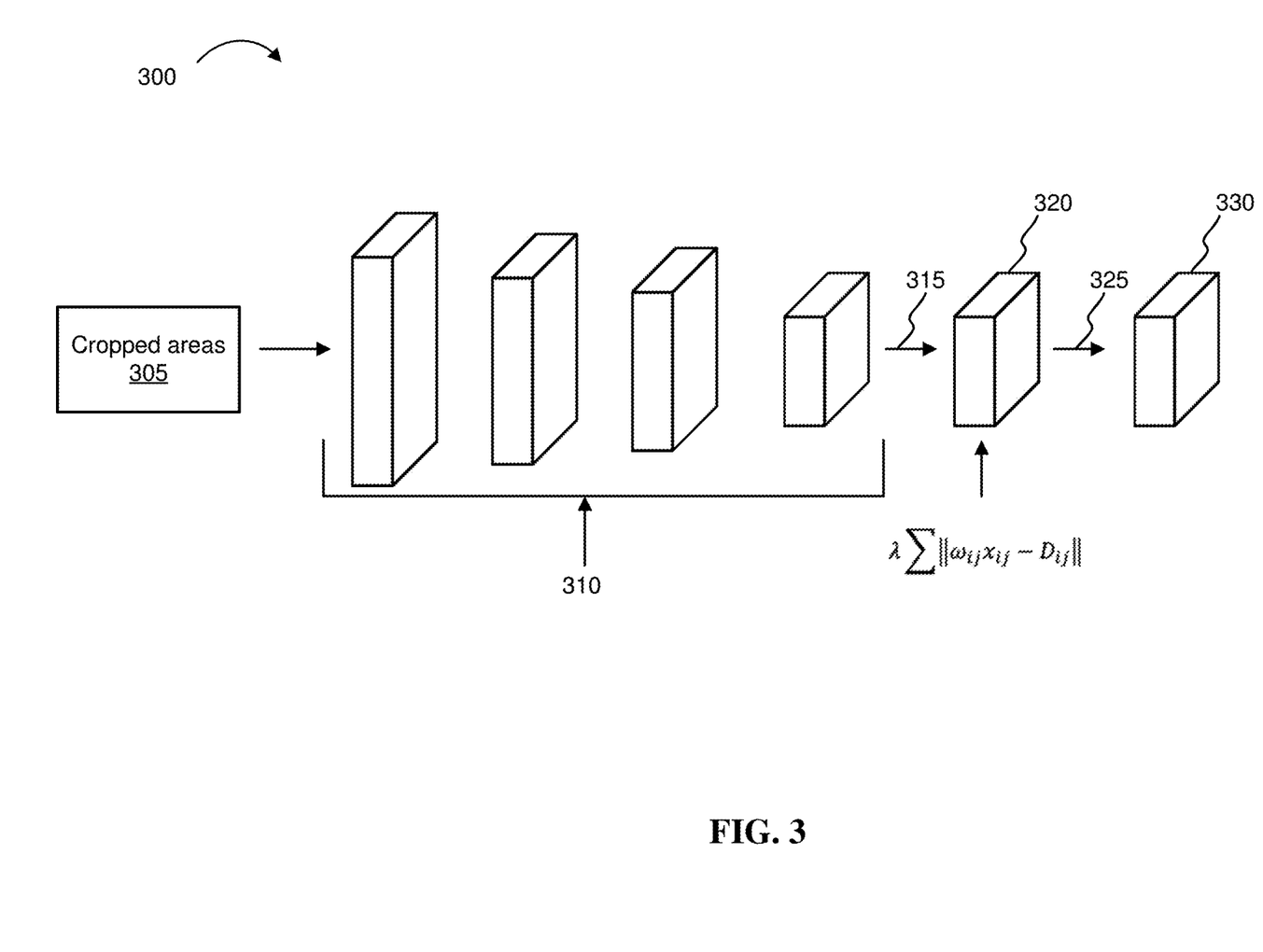
FIG. 3 depicts an example convolutional neural network that includes a spatial attention layer, in accordance with embodiments of the present disclosure.

FIG. 3 illustrates an example CNN 300 having a spatial attention layer 330, in accordance with embodiments of the present disclosure. In some embodiments, CNN 300 can be employed to detect objects in cropped areas 305, generated in accordance with embodiments of the present disclosure. In some embodiments, cropped areas 305 can include one or more portions of one or more frames (e.g., cropped area 255, FIG. 2). The CNN 300 can include a set of convolutional layers 310 configured to extract features of the cropped areas 305. In some embodiments, the set of convolutional layers 310 can output a feature map 315 corresponding to features of a cropped area 305. In some embodiments, the CNN 300 can include a head layer 330 for performing a specific task, such as classification and/or recognition. In some embodiments, a spatial attention layer 320 generated in accordance with operations described with respect to FIGS. 2 and 4 can be included between the set of convolutional layers 310 and the head layer 330. In some embodiments, the spatial attention layer 320 can output a refined feature 325 having spatial attention. For example, the refined feature 325 can be weighted to indicate an importance of a region of a cropped area, such as a region corresponding to a location of a detected object in a difference feature map. Thus, in some embodiments, the special attention layer 320 can regularize an output of a CNN.

In some embodiments, the spatial attention layer 330 can include a matrix according to the formula:

$$\lambda \Sigma \|\omega_{ij} x_{ij} - D_{ij}\|$$ (1), where:

$\lambda$ is a preselected scale factor that can be selected by an entity, such as a programmer of a DGS; $\omega_{ij} x_{ij}$ is a Sigmoid function applied to a 1 channel feature map corresponding to a cropped area (e.g., cropped area 255, FIG. 2); and $D_{ij}$ corresponds to values of a difference feature map (e.g., RGB values corresponding to object data 260).

Figure 4:
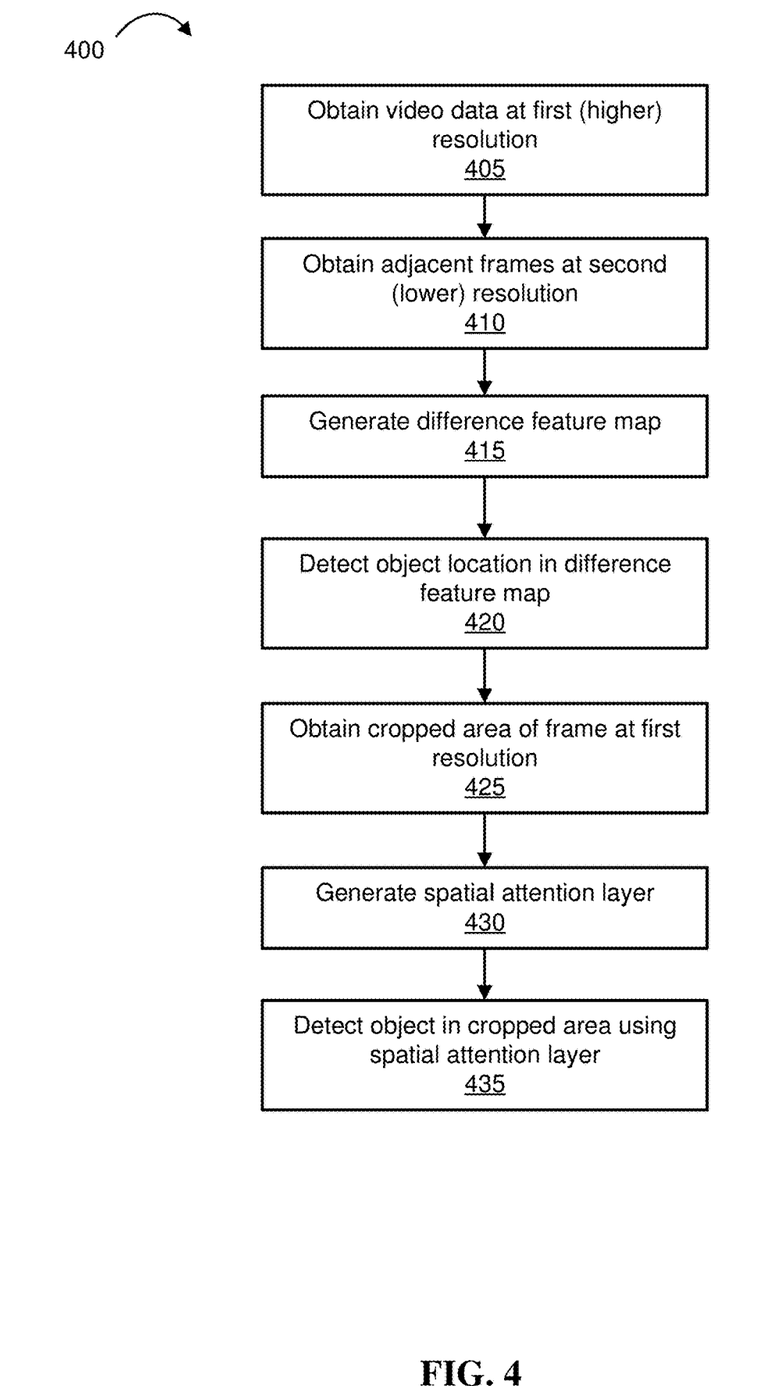
FIG. 4 depicts a flowchart of an example method for performing difference-guided video analysis operations, in accordance with embodiments of the present disclosure.

FIG. 4 illustrates a flowchart of an example method 400 for performing difference-guided video analysis operations, in accordance with embodiments of the present disclosure. The method 400 can be performed by a DGS, such as the DGS 105 discussed with respect to FIG. 1.

In operation 405, the DGS can obtain video data, such as a video file that includes a digital video having a resolution (e.g., an 8K resolution). The video data can include a set of frames, or images, each having a resolution, such as an 8K resolution. In some embodiments, the DGS can obtain such video data from a device, such as a computer device (e.g., computer device 120, FIG. 1), a server (e.g., server 130 FIG. 1), and/or an image capture device, such as a camera.

In operation 410, the DGS can obtain a set of adjacent frames of a video. In some embodiments, the set of adjacent frames can include two frames arranged in sequential order in a video. For example, in some embodiments, if a video has a frame rate of 20 frames per second, the set of adjacent frames can include the first and second frames, the ninth and tenth frames, or the nineteenth and twentieth frames of the video. The set of adjacent frames can have a lower resolution than a resolution of a source video (i.e., a video from which the set of adjacent frames is obtained). For example, in some embodiments, the DGS can obtain a source video having a (3,840×2,160) pixel resolution (hereinafter "4K resolution") in operation 405. Continuing with this example, in operation 410, the DGS can employ video editing tools to extract adjacent frames having a lower resolution, such as a (720× 480) pixel resolution, from the source video.

In operation 415, the DGS can generate a difference feature map. In this disclosure, a difference feature map can refer to a representation of a difference between features of two frames (e.g., two adjacent frames) of a video. In some embodiments, a difference feature map can include a matrix having a set of values corresponding to a set of pixel locations of a frame or image. For example, in some embodiments, such a matrix can include sets of RGB values corresponding to pixel locations of an image. Continuing with this example, for a pixel location (x=0, y=0) (e.g., a bottom, left pixel of an image), the matrix can store the RGB values (0, 0, 0), which can represent the color black. Continuing with this example, for a pixel location (x=10, y=50), the matrix can store the RGB values (255, 255, 255), which can represent the color white. In this example, pixel locations having RGB values that represent the color white can indicate pixel locations where there is a difference between a first frame and a second frame of a video (see, e.g., difference feature map image 240, discussed with respect to FIG. 2). In some embodiments, a difference feature map can include a difference feature map image (e.g., difference feature map image 240, FIG. 2).

In some embodiments, generating a difference feature map can include the DGS calculating a difference between RGB values corresponding to a first frame and RGB values corresponding to a second frame of a video. In some embodiments, operation 415 can include the DGS performing a principal component analysis of such calculated differences and/or clustering outputs corresponding to the calculated differences. In some embodiments, operation 415 can include the DGS selecting thresholds, such as a set of threshold RGB values that can indicate motion of an object in a difference feature map. In some embodiments, the DGS can implement machine learning processes to select such thresholds. In some embodiments, the thresholds can be selected by an entity, such as a programmer of DGS and/or a user of the DGS.

In operation 420, the DGS can detect a location of one or more objects in the difference feature map generated in operation 415. For example, in some embodiments, operation 420 can include the DGS analyzing pixel locations of the difference feature map having RGB values that exceed a threshold. Such pixel locations can correspond to motion of an object between adjacent frames of a video. Continuing with this example, the DGS can select an area of the difference feature map that includes the pixel locations having RGB values that exceed the threshold. Continuing with this example, the DGS can generate a bounding box that encloses such an area, which can be referred to as a bounding box area. The bounding box area can indicate an approximate location of an object in the difference feature map.

In operation 425, based on the bounding box area selected in operation 420, the DGS can obtain a cropped area from a third frame of a source video. The cropped area can include an object in the third frame that corresponds to an object detected in the difference feature map in operation 420. The third frame can have a resolution that is higher than a resolution of the adjacent frames obtained in operation 410. For example, in some embodiments, operation 425 can include the DGS obtaining a cropped area of an 8K-resolution frame. In some embodiments, operation 425 can include the DGS translating a bounding box area selected in operation 420 to a corresponding location in the third frame. For example, in some embodiments, the DGS can determine a relationship (e.g., a linear relationship) between pixel locations of a difference feature map having 720×480 pixels and corresponding pixel locations of a third frame having an 8K-resolution. Based on such a relationship, the DGS can identify a set of pixel locations of the 8K-resolution frame that correspond to the pixel locations of the bounding box area of the difference feature map. In this example, the identified corresponding set of pixel locations of the 8K-resolution frame can be referred to as a translated bounding box area. In some embodiments, the translated bounding box area can be identical or substantially similar to the cropped area. The cropped area can be smaller than an area of the third frame, as the DGS can extract the cropped area from the third frame. In some embodiments, the DGS can magnify an image of an object included in the cropped area. Such magnifying can improve object detection in subsequent frames obtained from a source video (e.g. object detection by CNN 300, FIG. 3).

In operation 430, the DGS can generate a spatial attention matrix according to formula (1) discussed with respect to FIG. 3. In some embodiments, the spatial attention matrix can be incorporated into a spatial attention layer of a CNN. The spatial attention matrix can weight pixel locations of frames that correspond to pixel locations where one or more objects are detected in a difference feature map. Accordingly, the spatial attention matrix can facilitate efficient, accurate detection of objects in frames.

In operation 435, the DGS can employ the spatial attention matrix generated in operation 430 to detect (e.g., locate and/or classify) an object in a cropped area of a video frame.

Figure 5:
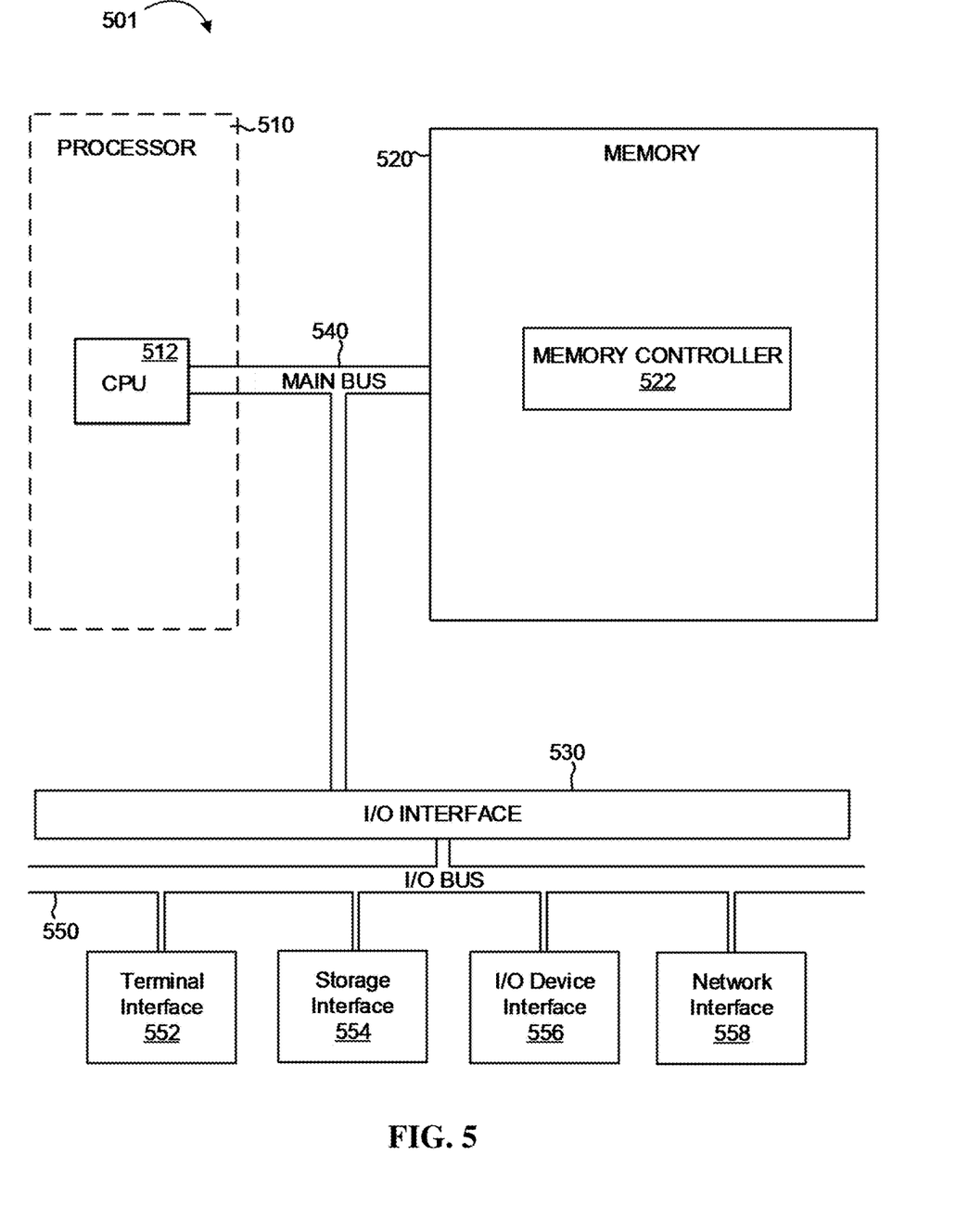
FIG. 5 depicts the representative major components of a computer system that can be used in accordance with embodiments of the present disclosure.

FIG. 5 depicts the representative major components of an exemplary Computer System 501 that can be used in accordance with embodiments of the present disclosure. The particular components depicted are presented for the purpose of example only and are not necessarily the only such variations. The Computer System 501 can comprise a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or non-volatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
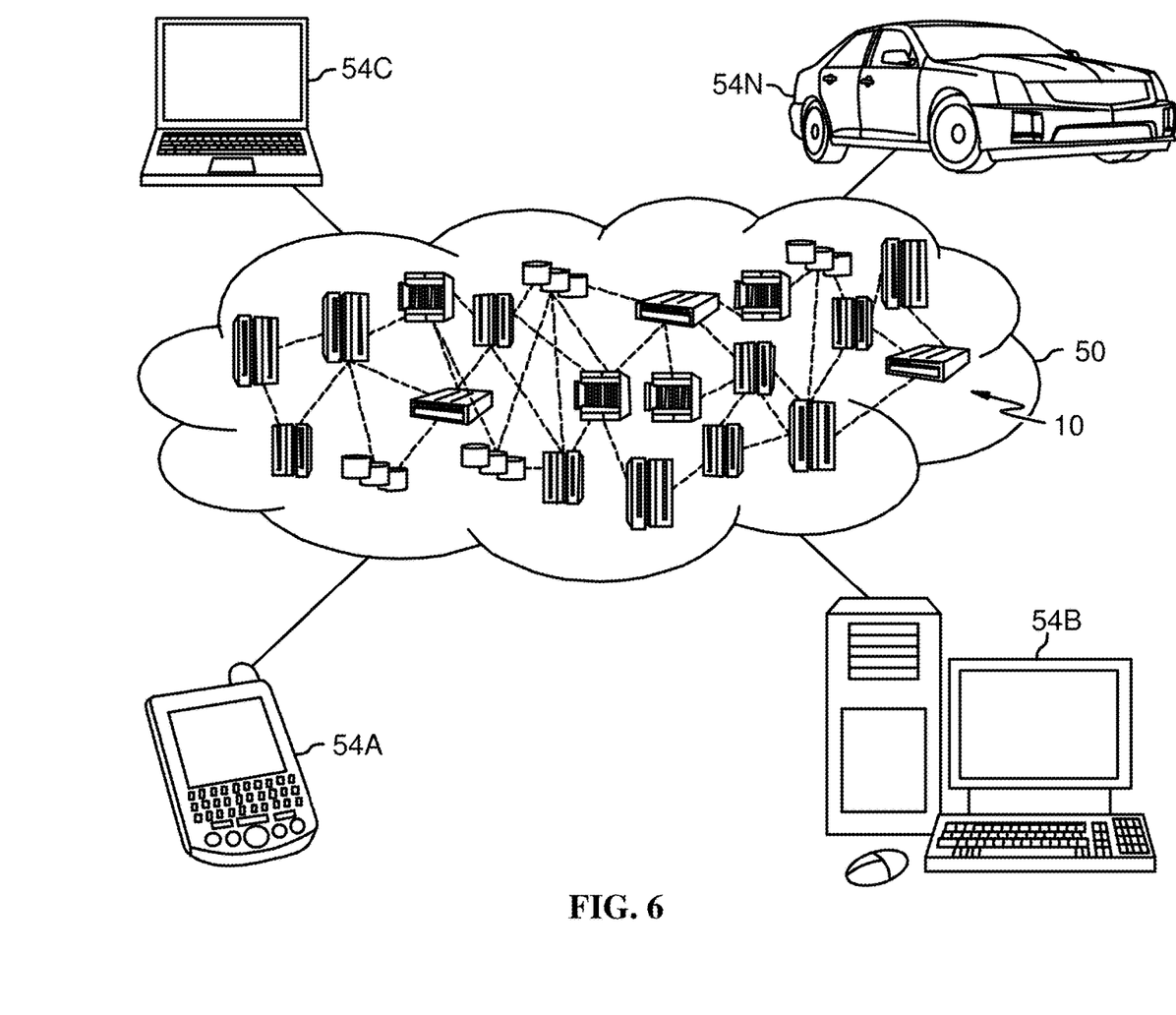
FIG. 6 depicts a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
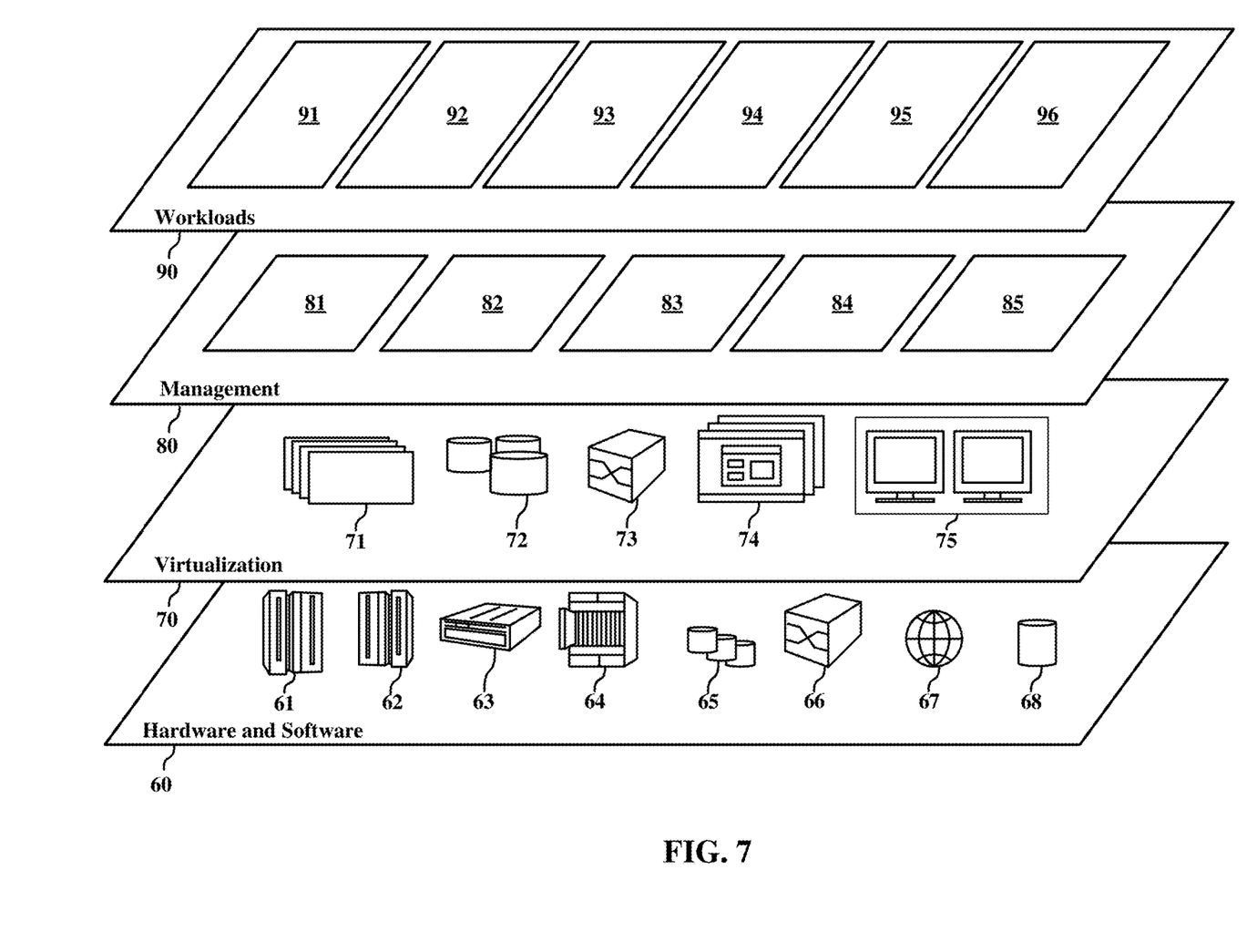
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and difference-guided video analysis logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, from a video having a first resolution, a set of frames having a second resolution, the first resolution being higher than the second resolution,
    wherein the set of frames comprises a first frame and a second frame adjacent to the first frame;
    generating, based on the first frame and the second frame, a difference feature map;
    obtaining, from the video, a third frame having the first resolution, the third frame having a third frame area;
    detecting, based on the difference feature map, a first location of a first object in the third frame;
    cropping, from the third frame, a first cropped area corresponding to the first object, the first cropped area being smaller than the third frame area;
    generating a first feature map of the first cropped area;
    generating, based on the first feature map and the difference feature map, a spatial attention layer of a convolutional neural network; and
    detecting, by the spatial attention layer, the first object in the first cropped area.

2. The computer-implemented method of claim 1, wherein the generating the difference feature map comprises calculating a difference between first values corresponding to first pixels of the first frame and second values corresponding to second pixels of the second frame.

3. The computer-implemented method of claim 2, wherein the first values and the second values comprise Red Green Blue (RGB) values.

4. The computer-implemented method of claim 1, further comprising generating, by the spatial attention layer, an output; and
    inputting the output into a head of the convolutional neural network.

5. The computer-implemented method of claim 1, wherein the detecting the first location comprises:
    identifying, in the difference feature map, a set of pixel locations having respective values that exceed a threshold;
    selecting a bounding box area that includes the set of pixel locations; and
    translating the bounding box area to the third frame, resulting in a translated bounding box area,
    wherein the translated bounding box area comprises the first cropped area.

6. The computer-implemented method of claim 1, wherein the detecting the first object comprises regularizing, by the spatial attention layer, an output of the convolutional neural network.

7. The computer-implemented method of claim 1, wherein the spatial attention layer comprises a calculation of a difference between a weighted output of the convolutional neural network and values of the difference feature map.

8. The computer-implemented method of claim 1, wherein the first resolution is (7680×4320) pixels and the second resolution is (680×480) pixels.

9. A system comprising:
    one or more processors; and
    one or more computer-readable storage media storing program instructions which, when executed by the one or more processors, are configured to cause the one or more processors to perform a method comprising:
        obtaining, from a video having a first resolution, a set of frames having a second resolution, the first resolution being higher than the second resolution,
        wherein the set of frames comprises a first frame and a second frame adjacent to the first frame;
        generating, based on the first frame and the second frame, a difference feature map;
        obtaining, from the video, a third frame having the first resolution, the third frame having a third frame area;
        detecting, based on the difference feature map, a first location of a first object in the third frame;
        cropping, from the third frame, a first cropped area corresponding to the first object, the first cropped area being smaller than the third frame area;
        generating a first feature map of the first cropped area;
        generating, based on the first feature map and the difference feature map, a spatial attention layer of a convolutional neural network; and
        detecting, by the spatial attention layer, the first object in the first cropped area.

10. The system of claim 9, wherein the generating the difference feature map comprises calculating a difference between first values corresponding to first pixels of the first frame and second values corresponding to second pixels of the second frame.

11. The system of claim 10, wherein the first values and the second values comprise Red Green Blue (RGB) values.

12. The system of claim 9, the method further comprising generating, by the spatial attention layer, an output; and
    inputting the output into a head of the convolutional neural network.

13. The system of claim 9, wherein the detecting the first location comprises:
    identifying, in the difference feature map, a set of pixel locations having respective values that exceed a threshold;
    selecting a bounding box area that includes the set of pixel locations; and
    translating the bounding box area to the third frame, resulting in a translated bounding box area,
    wherein the translated bounding box area comprises the first cropped area.

14. The system of claim 9, wherein the detecting the first object comprises regularizing, by the spatial attention layer, an output of the convolutional neural network.

15. The system of claim 9, wherein the spatial attention layer comprises a calculation of a difference between a weighted output of the convolutional neural network and values of the difference feature map.

16. A computer program product comprising one or more computer readable storage media, and program instructions collectively stored on the one or more computer readable storage media, the program instructions executable by one or more processors to cause the one or more processors to perform a method comprising:

obtaining, from a video having a first resolution, a set of frames having a second resolution, the first resolution being higher than the second resolution,
wherein the set of frames comprises a first frame and a second frame adjacent to the first frame;
generating, based on the first frame and the second frame, a difference feature map;
obtaining, from the video, a third frame having the first resolution, the third frame having a third frame area;
detecting, based on the difference feature map, a first location of a first object in the third frame;
cropping, from the third frame, a first cropped area corresponding to the first object, the first cropped area being smaller than the third frame area;
generating a first feature map of the first cropped area;
generating, based on the first feature map and the difference feature map, a spatial attention layer of a convolutional neural network; and
detecting, by the spatial attention layer, the first object in the first cropped area.

17. The computer program product of claim 16, wherein the generating the difference feature map comprises calculating a difference between first values corresponding to first pixels of the first frame and second values corresponding to second pixels of the second frame.

18. The computer program product of claim 17, wherein the first values and the second values comprise Red Green Blue (RGB) values.

19. The computer program product of claim 16, the method further comprising generating, by the spatial attention layer, an output; and
inputting the output into a head of the convolutional neural network.

20. The computer program product of claim 16, wherein the detecting the first location comprises:
identifying, in the difference feature map, a set of pixel locations having respective values that exceed a threshold;
selecting a bounding box area that includes the set of pixel locations; and
translating the bounding box area to the third frame, resulting in a translated bounding box area,
wherein the translated bounding box area comprises the first cropped area.

* * * * *